(12) United States Patent
Tseng

(10) Patent No.: US 7,543,967 B1
(45) Date of Patent: Jun. 9, 2009

(54) ROTATABLE VEHICULAR LAMP ASSEMBLY HAVING A VIBRATION-LIMITING ELEMENT

(76) Inventor: Chian-Yin Tseng, No. 60, Lane 105, Wen-Nan Road, Tainan City (TW)

( * ) Notice: Subject to any disclaimer, the term of this patent is extended or adjusted under 35 U.S.C. 154(b) by 0 days.

(21) Appl. No.: 11/966,085

(22) Filed: Dec. 28, 2007

(51) Int. Cl.
*F21V 15/04* (2006.01)
(52) U.S. Cl. .................. 362/390; 362/286; 362/369; 362/524
(58) Field of Classification Search .............. 362/35, 362/286, 287, 369, 386, 390, 427, 428, 523, 362/524, 525, 526
See application file for complete search history.

(56) References Cited

U.S. PATENT DOCUMENTS

| 4,870,552 A | * | 9/1989 | Vitta et al. | 362/369 |
| 5,860,726 A | * | 1/1999 | Richardson | 362/390 |
| 7,163,323 B1 | | 1/2007 | Tseng | |
| 2002/0064051 A1 | * | 5/2002 | Sugimoto et al. | 362/526 |
| 2003/0223245 A1 | * | 12/2003 | Abe | 362/523 |
| 2004/0264209 A1 | * | 12/2004 | Okawa | 362/524 |

FOREIGN PATENT DOCUMENTS

| DE | 10 2007002691 A1 | 8/2007 |
| EP | 1516782 B1 | 3/2005 |
| EP | 1820694 A3 | 8/2007 |
| GB | 303766 A | 1/1929 |

* cited by examiner

*Primary Examiner*—Y My Quach Lee
(74) *Attorney, Agent, or Firm*—Choate, Hall & Stewart, LLP; Christopher J. McKenna

(57) ABSTRACT

A rotatable vehicular lamp assembly includes a main frame having spaced-apart top and bottom main plates, a lighting unit, and a drive unit. The lighting unit includes a lamp seat holder connected pivotally to the top and bottom main plates for rotation relative to the main frame, and a lamp seat connected to and rotatable synchronously with the lamp seat holder. The drive unit includes a motor mounted on the main frame to rotate the lamp seat holder relative to the main frame. A vibration-limiting element is disposed between the main frame and the lamp seat holder to limit vibration of the lamp seat holder.

5 Claims, 5 Drawing Sheets

ROTATABLE VEHICULAR LAMP ASSEMBLY HAVING A VIBRATION-LIMITING ELEMENT

BACKGROUND OF THE INVENTION

1. Field of the Invention

This invention relates to a rotatable vehicular lamp assembly, more particularly to a rotatable vehicular lamp assembly having a vibration-limiting element.

2. Description of the Related Art

Conventional vehicular lamps are fixed to vehicular lamp holders, respectively. When the vehicle turns along a curve in the road, the vehicular lamps cannot concurrently turn, so that pertinent portions of the road may not be illuminated by the vehicular lamps. Since the conventional vehicular lamps cannot provide a driver of the vehicle a clear and bright situation of the roadway, road accidents may easily occur.

In order to resolve the aforementioned drawback, many manufacturers have performed research and development on vehicular lamps. Currently available in the market is a vehicular lamp that can be controlled so as to rotate synchronously with a steering wheel or vehicle wheels. The vehicular lamp includes a fixed base seat, a lighting unit connected pivotally to a front side of the fixed base seat so as to be movable leftward and rightward, and a drive unit mounted on the fixed base seat to activate the lighting unit to rotate. The drive unit usually includes a gear wheel for driving the lighting unit. To allow the lighting unit to rotate, a space is provided between the fixed base seat and the lighting unit, as well as between the gear wheel and a rotary shaft.

However, the aforementioned vehicular lamp has the following drawbacks:

1. Because of the presence of the spaces as described above, the vehicular lamp is likely to deflect quickly during a turn of the vehicle, so that a rotating angle of the vehicular lamp is not consistent with the turning angle of the vehicle.

2. Since the vehicle frequently, if not always, vibrates, such vibration is transmitted to the lighting unit and rocks the same, so that the light emitted by the lighting unit is scattered, thereby rendering the illuminating effect of the lighting unit unstable. Further, noise is produced due to such vibration of the lighting unit.

SUMMARY OF THE INVENTION

Therefore, an object of the present invention is to provide a rotatable vehicular lamp assembly that is capable of overcoming the aforementioned drawbacks of the prior art.

According to this invention, a rotatable vehicular lamp assembly comprises a main frame, a lighting unit, a drive unit, and a vibration-limiting element. The main frame has a bottom main plate, and a top main plate spaced apart from the bottom main plate. The lighting unit includes a lamp seat holder connected pivotally to the top and bottom main plates for rotation relative to the main frame, and a lamp seat connected to and rotatable synchronously with the lamp seat holder. The drive unit includes a motor mounted on the main frame to rotate the lamp seat holder relative to the main frame. The vibration-limiting element is disposed between the main frame and the lamp seat holder to limit vibration of the lamp seat holder.

BRIEF DESCRIPTION OF THE DRAWINGS

Other features and advantages of the present invention will become apparent in the following detailed description of embodiments of the invention, with reference to the accompanying drawings, in which.

DETAILED DESCRIPTION

Figure 1:
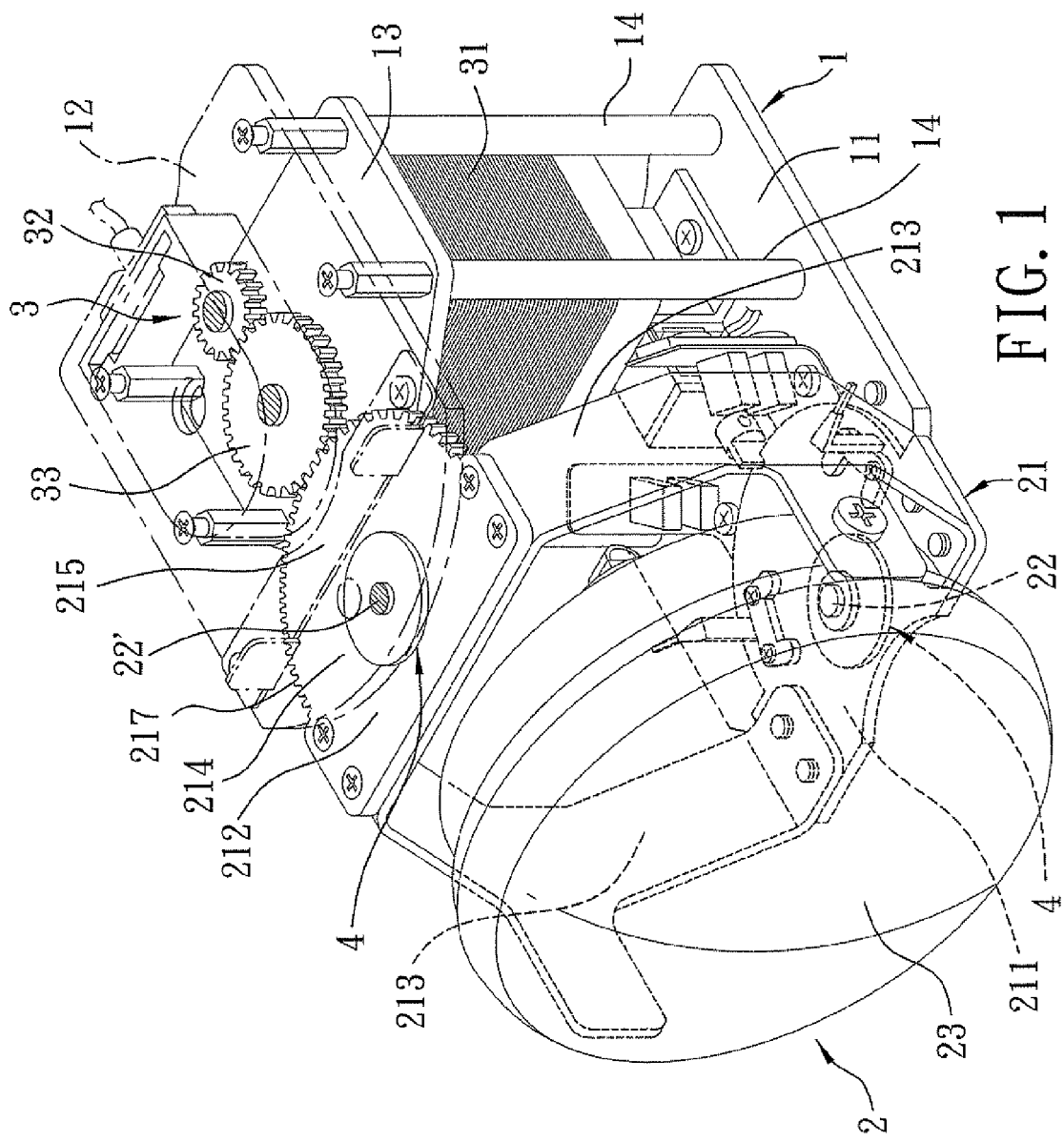
FIG. 1 is a perspective view of a rotatable vehicular lamp assembly according to an embodiment of the present invention.

Before the present invention is described in greater detail, it should be noted that the same reference numerals have been used to denote like elements throughout the specification.

Figure 2:
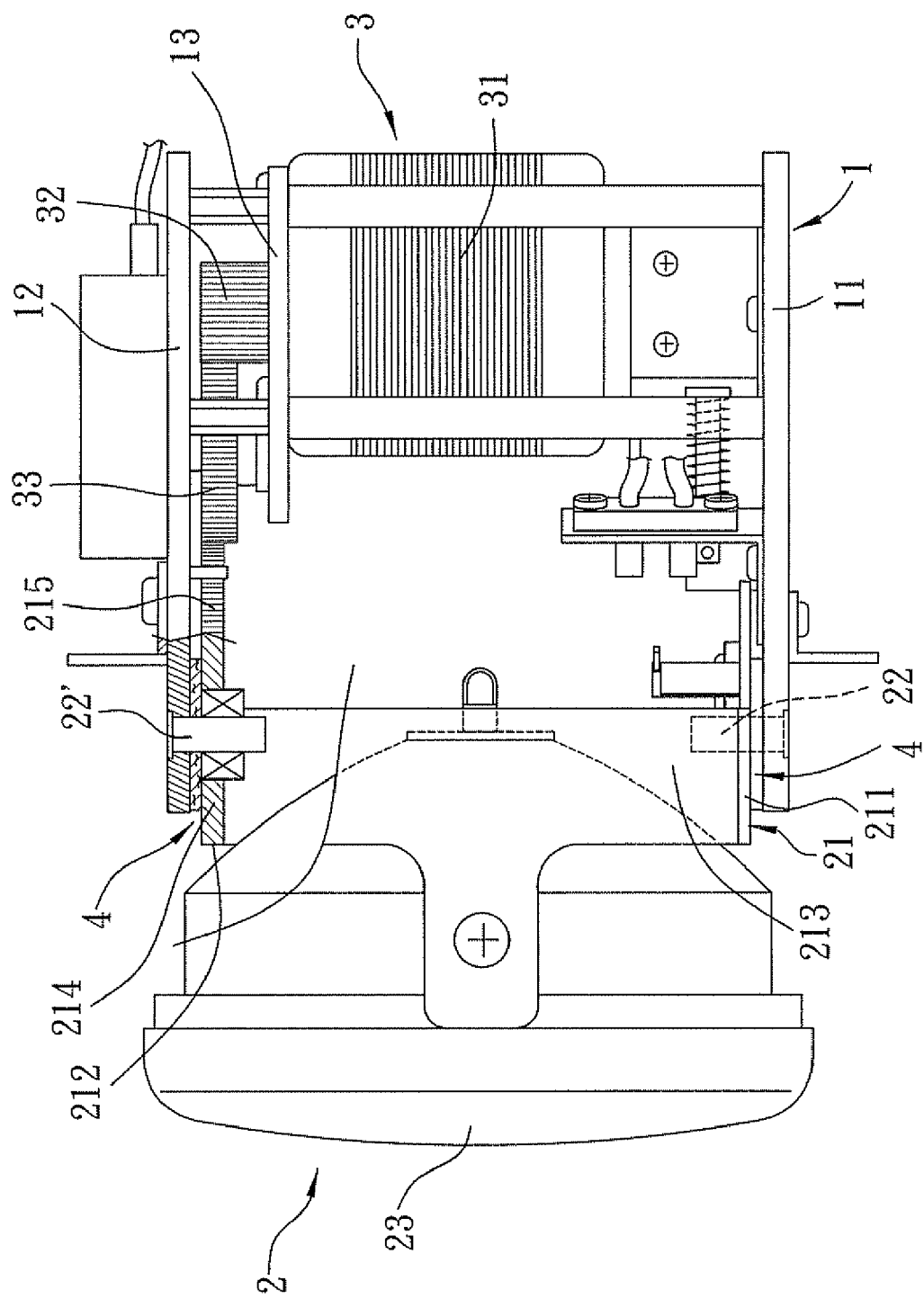
FIG. 2 is a schematic side view of the embodiment of FIG. 1.
Figure 3:
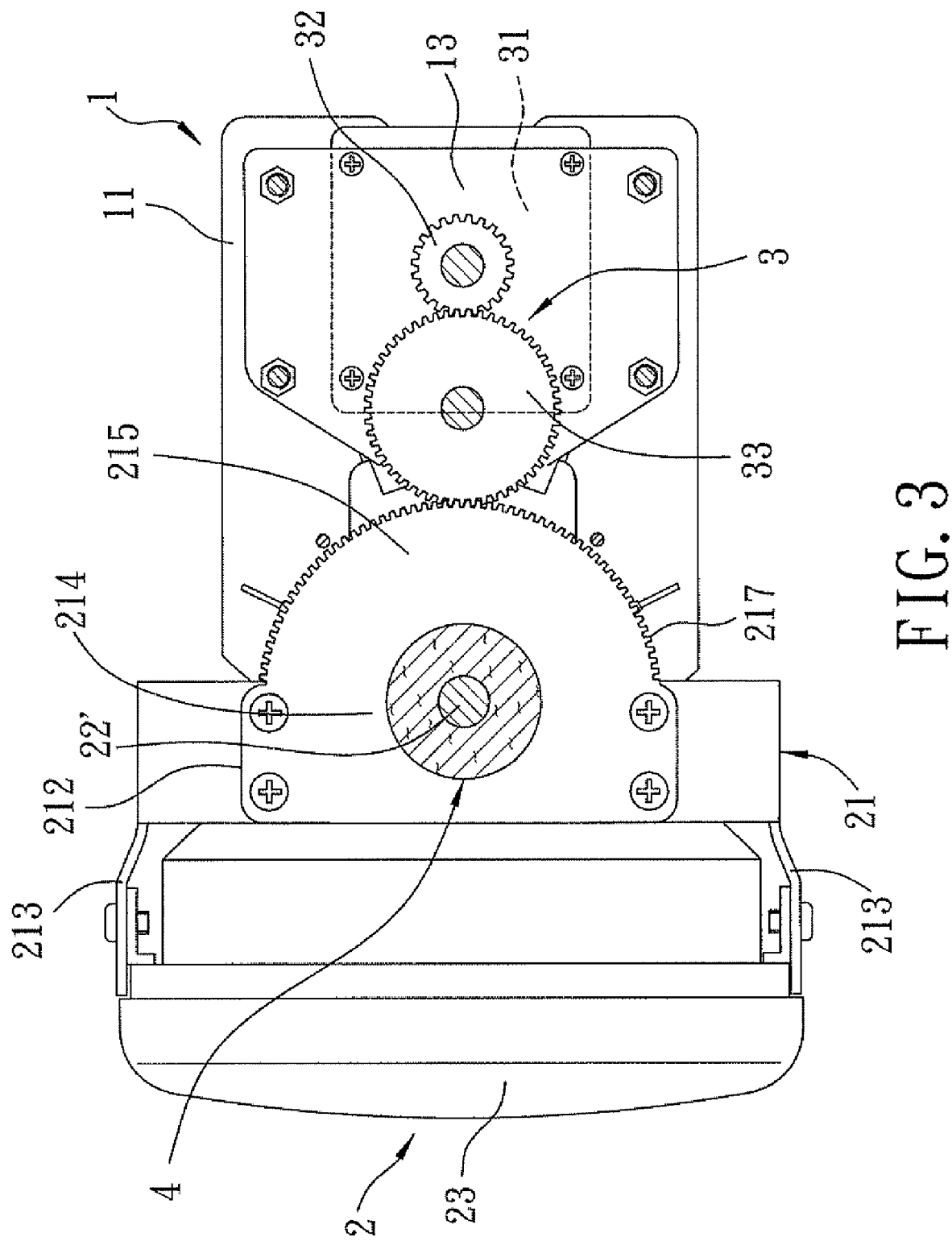
FIG. 3 is a schematic top view of the embodiment of FIG. 1.

Referring to FIGS. 1, 2, and 3, a rotatable vehicular lamp assembly according to an embodiment of the present invention is shown to comprise a main frame 1, a lighting unit 2, a drive unit 3, and a vibration-limiting element 4.

The main frame 1 has a horizontal bottom main plate 11, a horizontal top main plate 12 spaced apart from the bottom main plate 11, and a horizontal partition plate 13 connected between rear sides of the top and bottom main plates 12, 11 through a plurality of support rods 14. In this embodiment, the partition plate 13 is proximate to the top main plate 12.

The lighting unit 2 includes a lamp seat holder 21 disposed between front sides of the top and bottom main plates 12, 11, first and second pivot pins 22', 22 connecting pivotally the lamp seat holder 21 to the top and bottom main plates 12, 11 so that the lamp seat holder 21 is rotatable leftward and rightward relative to the main frame 1, and a lamp seat 23 connected to and rotatable synchronously with the lamp seat holder 21. The lamp seat holder 21 has a bottom holder plate 211 connected pivotally to and disposed above the front side of the bottom main plate 11 through the second pivot pin 22 that extends through the bottom holder plate 211 and the bottom main plate 11, a top holder plate 212 disposed below the front side of the top main plate 12, and two curved side plates 213 screwed between the bottom and top holder plates 211, 212. The top holder plate 212 has a front plate portion 214 connected pivotally to the top main plate 12 through the first pivot pin 22' that extends through the top holder plate 212 and the top main plate 12, and a sector-shaped gear-toothed plate portion 215 extending rearwardly from the front plate portion 214 and rotatable about the first pivot pin 22'. The sector-shaped gear-toothed plate portion 215 has a periphery formed with a plurality of engaging teeth 217.

The drive unit 3 includes a motor 31 mounted on the main frame 1 between the bottom main plate 11 and the partition plate 13 to rotate the lamp seat holder 21 leftward and rightward relative to the main frame 1, a drive gear wheel 32 disposed between the partition plate 13 and the top main plate 12 and driven by the motor 31, and a driven gear wheel 33 connected pivotally between the partition plate 13 and the top main plate 12 and meshed between the drive gear wheel 32 and the engaging teeth 217 of the gear-toothed plate portion 215. The motor 31 is a stepper motor in this embodiment. The drive gear wheel 32 is sleeved on a drive shaft of the motor 31.

The vibration-limiting element 4 is disposed between the main frame 1 and the lamp seat holder 21 so as to absorb and limit vibration of the lamp seat holder 21. In this embodiment, two vibration-limiting elements 4 is disposed between the top main plate 12 and the top holder plate 212, and is configured as a piece of wool felt that is disposed around the first pivot pin 22' and that abuts against the top main plate 12 and the top holder plate 212. The other one of the vibration-limiting elements 4 is disposed between the bottom main plate 11 and the bottom holder plate 211, and is configured as a piece of wool felt that is disposed around the second pivot pin 22 and that abuts against the bottom main plate 11 and the bottom holder plate 211. In other embodiments, any one of the vibration-limiting elements 4 may be omitted, such as the vibration-limiting element 4 that is disposed between the bottom main plate 11 and the bottom holder plate 211.

When the motor 31 activates the drive gear wheel 32 to rotate, since the drive gear wheel 32 is meshed with the driven gear wheel 33, which in turn, is meshed with the engaging teeth 217 of the gear-toothed plate portion 215 of the top holder plate 212, the lamp seat holder 21 and the lamp seat 23 are pivoted leftward and rightward relative to the main frame 1. Hence, the vehicular lamp is rotated. During rotation of the vehicular lamp, the vibration-limiting elements 4 absorb and limit the vibration of the lamp seat holder 21, so that the lighting unit 2 rotates stably and is silent (or otherwise with a reduction in noise).

Figure 4:
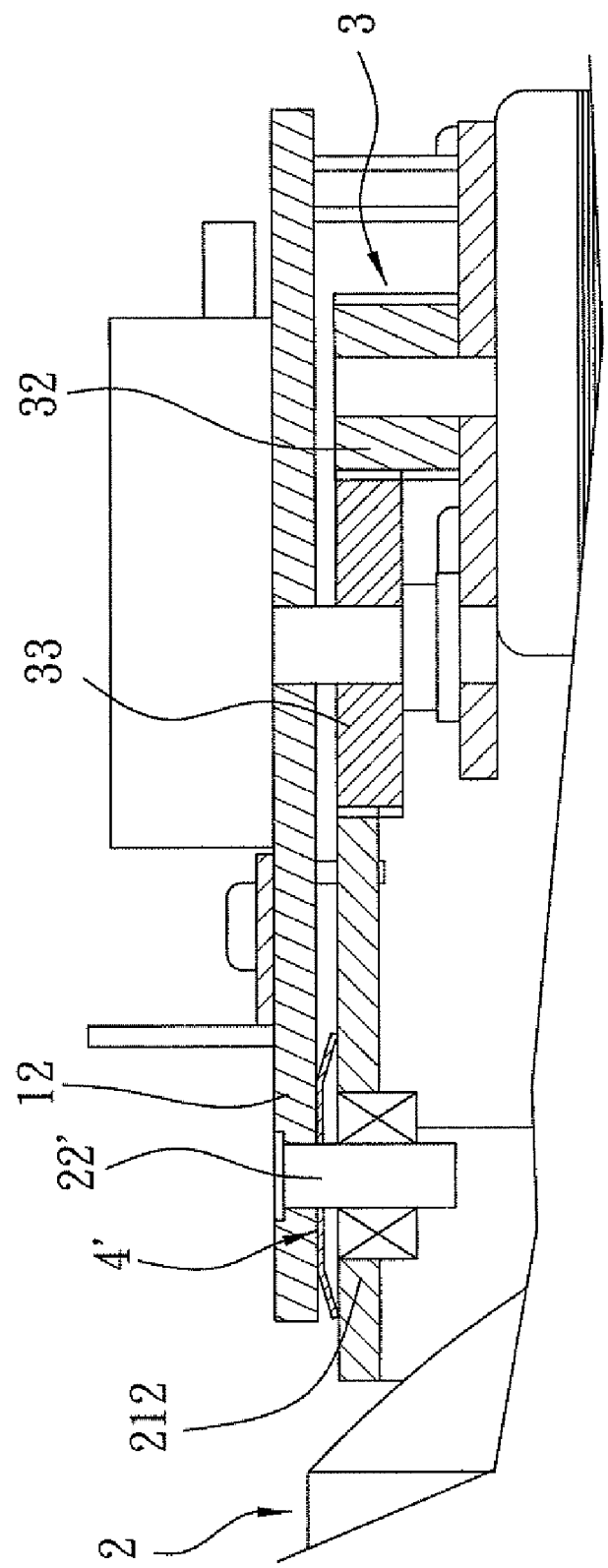
FIG. 4 is a fragmentary sectional view of a rotatable vehicular lamp assembly according to another embodiment of the present invention.

Referring to FIG. 4, a rotatable vehicular lamp assembly according to another embodiment of the present invention is shown to be similar to the embodiments described in conjunction with FIGS. 1, 2 and 3. However, in this embodiment, each of the vibration-limited elements 4' (only the vibration-limiting element 4' that is disposed between the top holder plate 212 and the top main plate 12 is shown) is configured as a spring plate, which can similarly effect stable rotation of the lighting unit 2.

Figure 5:
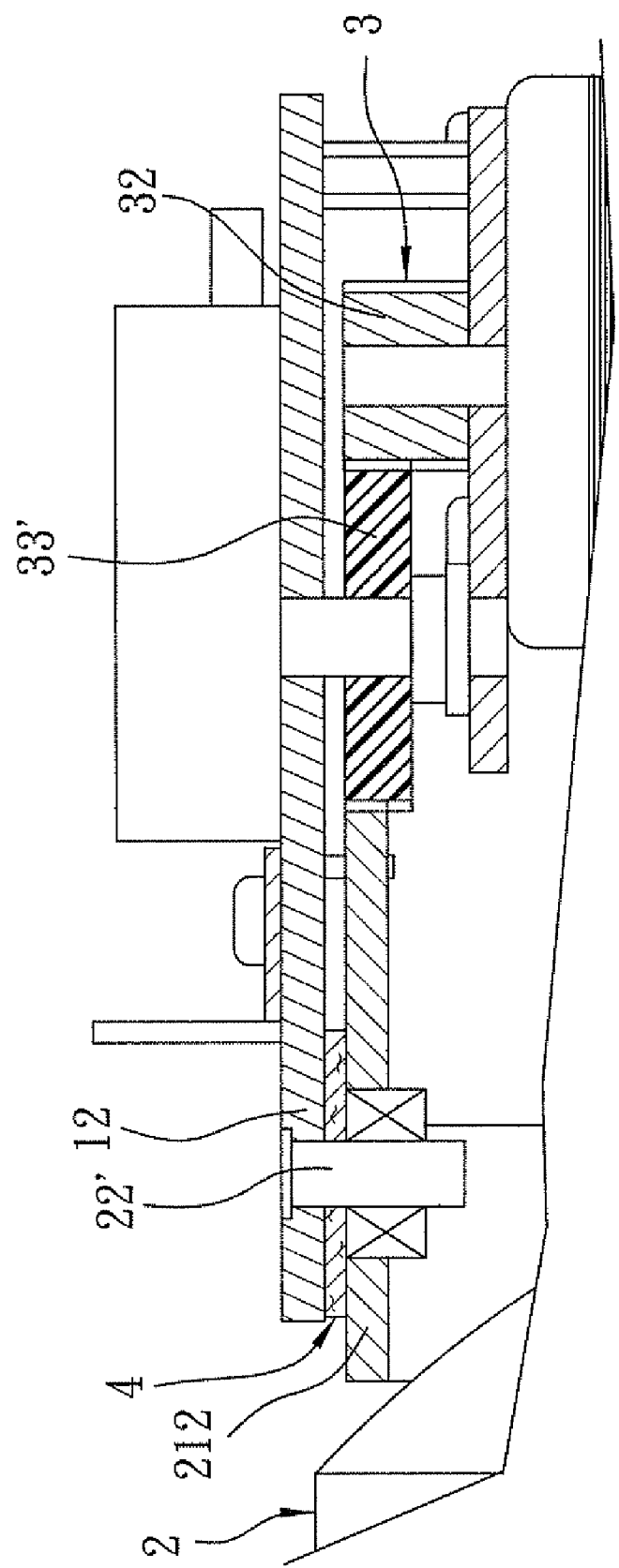
FIG. 5 is a fragmentary sectional view of a rotatable vehicular lamp assembly according to yet another embodiment of the present invention.

Referring to FIG. 5, a rotatable vehicular lamp assembly according to one embodiment of the present invention is shown to be similar to the embodiment described in conjunction with FIGS. 1, 2 and 3. However, in this embodiment, the driven gear wheel 33' is made of plastic, so that noise can be minimized during rotation of the lighting unit 2.

It should be noted that the locations of some of the components of the aforementioned rotatable vehicular lamp assembly of the present invention can be reversed. For example, the partition plate 13 may be disposed proximate to the bottom main plate 11 instead of the top main plate 12, so that the drive gear wheel 32 may be disposed between the partition plate 13 and the bottom main plate 11, in which case the gear-toothed plate portion 215 may be provided on the bottom holder plate 211 instead of the top holder plate 212, and the driven gear wheel 33 may be disposed proximate to the bottom main plate 11 instead of the top main plate 12 so that the driven gear wheel 33 may be similarly meshed between the drive gear wheel 32 and the gear-toothed plate portion 215. Rotation of the vehicular lamp assembly can be similarly achieved. Hence, the locations of the components are not limited to the embodiments disclosed above and shown in the drawings.

The advantages of the rotatable vehicular lamp assembly of the present invention can be summarized as follows:

1. Since the vibration-limiting elements 4 are provided between the main frame 1 and the lamp seat holder 21, the vibration-limiting elements 4 can fully absorb vibrations associated with the lamp seat holder 21, and can appropriately produce damping forces during rotation of the lighting unit 2, so that the lighting unit 2 can indeed stop at a preset angle. Hence, accurate control of the rotating angle of the lighting unit 2 is achieved.

2. Due to the presence of the vibration-limiting elements 4, the lighting unit 2 can move stably, so that the light emitted from the lamp seat 23 will not scatter. Further, noise is minimized.

While the present invention has been described in connection with what are considered the most practical embodiments, it is understood that this invention is not limited to the disclosed embodiments but is intended to cover various arrangements included within the spirit and scope of the broadest interpretations and equivalent arrangements.

I claim:

1. A rotatable vehicular lamp assembly, comprising:
    a main frame having a bottom main plate, and a top main plate spaced apart from said bottom main plate;
    a lighting unit including a lamp seat holder connected pivotally to said top and bottom main plates for rotation relative to said main frame, and a lamp seat connected to and rotatable synchronously with said lamp seat holder, said lamp seat holder having a top holder plate connected pivotally to said top main plate, and a bottom holder plate connected pivotally to said bottom main plate;
    a first pivot pin extending through said top holder plate and said top main plate;
    a second pivot pin extending through said bottom holder plate and said bottom main plate;
    a drive unit including a motor mounted on said main frame to rotate said lamp seat holder relative to said main frame; and
    two vibration-limiting elements each of which is in the form of a plate capable of vibration absorption, one of said vibration-limiting elements being disposed between said top holder plate and said top main plate around said first pivot pin and having top and bottom surfaces respectively abutting against said top holder plate and said top main plate, the other one of said vibration-limiting elements being disposed between said bottom holder plate and said bottom main plate around said second pivot pin and having top and bottom surfaces respectively abutting against said bottom holder plate and said bottom main plate.

2. The rotatable vehicular lamp assembly of claim 1, characterized in that said plate of at least one of said vibration-limiting elements is made from a piece of wool felt.

3. The rotatable vehicular lamp assembly of claim 1, characterized in that said plate of at least one of said vibration-limiting elements is a spring plate.

4. The rotatable vehicular lamp assembly of claim 1, characterized in that said top holder plate of said lamp seat holder has a sector-shaped gear-toothed plate portion rotatable about said first pivot pin, said drive unit further including a drive gear wheel driven by said motor, and a driven gear wheel connected pivotally to said top main plate and meshed between said drive gear wheel and said gear-toothed plate portion.

5. The rotatable vehicular lamp assembly of claim 4, characterized in that said driven gear wheel is made of plastic.

* * * * *